US009612310B2

United States Patent
Schultz et al.

(10) Patent No.: US 9,612,310 B2
(45) Date of Patent: Apr. 4, 2017

(54) METHOD AND APPARATUS FOR DETERMINING THE DIRECTION OF ARRIVAL OF A SONIC BOOM

(71) Applicant: The Boeing Company, Chicago, IL (US)

(72) Inventors: Todd Martin Schultz, Seattle, WA (US); James Robert Underbrink, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 202 days.

(21) Appl. No.: 14/604,088

(22) Filed: Jan. 23, 2015

(65) Prior Publication Data
US 2016/0216357 A1 Jul. 28, 2016

(51) Int. Cl.
G01S 3/80 (2006.01)
H04R 1/40 (2006.01)
H04R 3/00 (2006.01)

(52) U.S. Cl.
CPC ............. G01S 3/80 (2013.01); H04R 1/406 (2013.01); H04R 3/005 (2013.01); H04R 2201/401 (2013.01); H04R 2201/405 (2013.01)

(58) Field of Classification Search
CPC ........... G01S 3/80; H04R 1/406; H04R 3/005; H04R 2201/405
See application file for complete search history.

(56) References Cited

U.S. PATENT DOCUMENTS

| 5,252,980 A * | 10/1993 | Gray ..................... G01S 13/003 342/107 |
| 5,831,936 A * | 11/1998 | Zlotnick ................. G01S 3/801 367/124 |
| 6,205,224 B1 | 3/2001 | Underbrink |
| 7,872,948 B2 | 1/2011 | Davis et al. |
| 2002/0140605 A1* | 10/2002 | Kozlov ................... G01S 3/807 342/417 |
| 2006/0241490 A1* | 10/2006 | Lazenby .............. A61B 8/4483 600/472 |
| 2009/0326870 A1 | 12/2009 | Brusniak |

OTHER PUBLICATIONS

Nawab et al., "Direction Determination of Wideband Signals," IEEE Transaction on Acoustic, Speech, and Signal Processing, vol. ASSP-33, No. 4, Oct. 1985, pp. 1114-1122.

* cited by examiner

Primary Examiner — Luke Ratcliffe
Assistant Examiner — Hovhannes Baghdasaryan
(74) Attorney, Agent, or Firm — Yee & Associates, P.C.

(57) ABSTRACT

A method and apparatus for determining a direction of arrival of an acoustic event of interest that arrives at an array. Data acquired from the array is received. A portion of the data that represents an acoustic signature for the acoustic event of interest is identified. An azimuth angle may be computed for an acoustic event using the portion of the data identified. An elevation angle for the acoustic event is computed using a beamforming process customized based on the azimuth angle computed.

18 Claims, 7 Drawing Sheets

METHOD AND APPARATUS FOR DETERMINING THE DIRECTION OF ARRIVAL OF A SONIC BOOM

BACKGROUND INFORMATION

1. Field

The present disclosure relates generally to acoustic events and, in particular, to arrays used to detect acoustic events, such as sonic booms. Still more particularly, the present disclosure relates to a method and apparatus for determining the direction of arrival of a sonic boom detected using a microphone array.

2. Background

Microphone arrays are oftentimes used to detect acoustic events. Many different configurations may be possible for a microphone array. When an acoustic event is detected using a microphone array, it may be desirable to determine a direction of arrival of the acoustic event.

A sonic boom is an example of an acoustic event. A sonic boom is the sound associated with the shock waves created by an object traveling through the air faster than the speed of sound. For example, certain types of aerial vehicles may be capable of traveling faster than the speed of sound, thereby creating a sonic boom.

The direction of arrival of a sonic boom may be the direction in which the sonic boom is propagating when the sonic boom arrives at the microphone array. The direction of arrival of an acoustic event, such as a sonic boom, may be defined by an azimuth angle and elevation angle relative to the microphone array. In some cases, depending on the type of acoustic event and type of object that created the acoustic event, the direction of arrival of the acoustic event at the microphone array may then be used to identify other information about the acoustic event or the object that created the acoustic event. For example, the direction of arrival may be used to infer the location of the object relative to the microphone array, information about the propagation path of the acoustic event, or other types of information.

The direction of arrival of the sonic boom may be determined using some currently available beamforming techniques. However, the amount of time and processing resources needed to determine the direction of arrival of the sonic boom using these currently available beamforming techniques may be greater than desired. Further, some currently available beamforming techniques may be able to determine the azimuth angle of the object more quickly but may be unable to determine the elevation angle of the object. Therefore, it would be desirable to have a method and apparatus that take into account at least some of the issues discussed above, as well as other possible issues.

SUMMARY

In one illustrative embodiment, a method for determining a direction of arrival of an acoustic event of interest that arrives at an array is provided. Data acquired from the array is received. A portion of the data that represents an acoustic signature for the acoustic event of interest is identified. An azimuth angle may be computed for an acoustic event using the portion of the data identified. An elevation angle for the acoustic event is computed using a beamforming process customized based on the azimuth angle computed.

In another illustrative embodiment, a method for determining a direction of arrival of a sonic boom that arrives at an array is provided. Data acquired from an array is received. A portion of the data that represents a sonic boom signature for the sonic boom that arrives at the array is identified. An azimuth angle for the sonic boom is computed using the portion of the data identified. An elevation angle for the sonic boom is computed using a beamforming process customized based on the azimuth angle computed.

In yet another illustrative embodiment, an apparatus comprises an array and a data processor. The array is comprised of a plurality of acoustic sensors. The data processor receives data acquired from the array. The data processor further identifies a portion of the data that represents an acoustic signature for an acoustic event of interest. The data processor further computes an azimuth angle for an acoustic event using the portion of the data identified. The data processor still further computes an elevation angle for the acoustic event using a beamforming process customized based on the azimuth angle computed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to determine the direction of arrival of an acoustic event, such as a sonic boom, more quickly and using fewer processing resources than is currently possible using conventional beamforming techniques.

The illustrative embodiments recognize and take into account that the time and computational power needed to compute one of the azimuth angle and the elevation angle for the direction of arrival of an acoustic event may be simplified by computing the other first. However, conventional beamforming techniques for broadband signals rely on applying time delays based on the propagation speed of the acoustic event. With a sonic boom, the propagation speed is the speed of sound. With these conventional beamforming techniques, computing one angle before the other may not be possible. For example, computing the azimuth angle using conventional beamforming techniques requires that the trace speed along the plane of the array be known. However, the trace speed may be an unknown value.

The illustrative embodiments recognize and take into account that wavenumber spectrum techniques may allow the azimuth angle of propagation of an acoustic event relative to a microphone array to be determined quickly without prior knowledge of the trace speed. The computed azimuth angle may then be used to compute a trace speed with respect to that azimuth angle. However, the illustrative embodiments recognize and take into account that wavenumber spectrum techniques alone may be unable to determine the elevation angle of propagation.

Consequently, the illustrative embodiments recognize that a unique combination of a wavenumber spectrum process and a conventional beamforming process may be needed. In particular, the illustrative embodiments recognize that the azimuth angle computed using a wavenumber spectrum process may be used to reduce the time and computational processing needed to determine an elevation angle using a time-delay based beamforming process. This combination of techniques may reduce the overall time and processing power needed to determine the direction of arrival of an acoustic event, such as a sonic boom.

Thus, the illustrative embodiments provide for determining a direction of arrival of an acoustic event created by an acoustic source. The acoustic event may take the form of, but is not limited to, a sonic boom. The acoustic source may take the form of, but is not limited to, an aerial vehicle.

In one illustrative example, data generated by an array receiving acoustic waves created by an acoustic source is received. The array may take the form of, but is not limited to, a microphone array. The microphone array may be, for example, without limitation, a non-redundant microphone spiral array. A portion of the received data that represents an acoustic signature for the acoustic event of interest may be identified. An azimuth angle for the acoustic source may be computed using the portion of the data identified. An elevation angle for the acoustic source may be computed using a beamforming process customized based on the azimuth angle computed.

Figure 1:
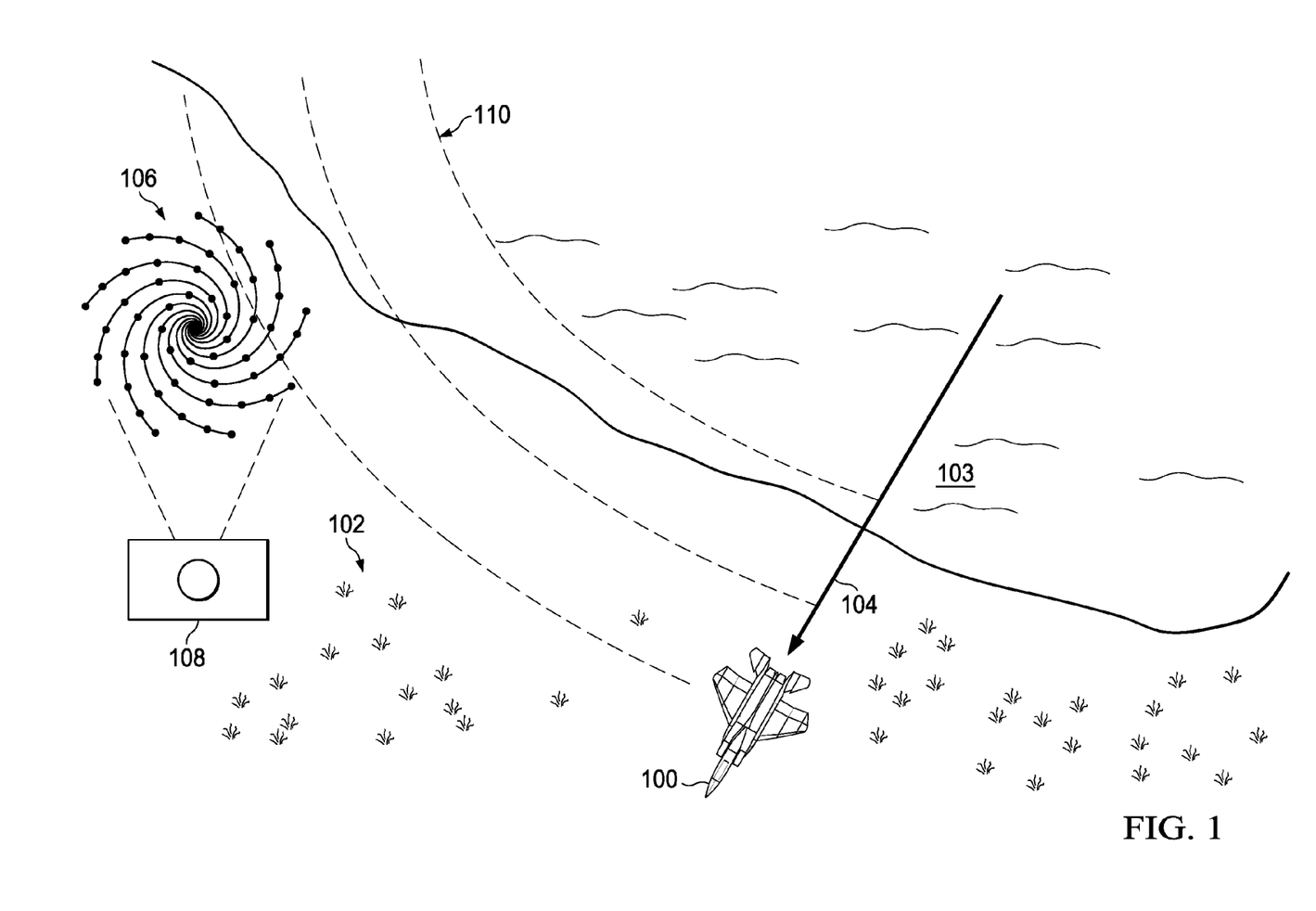
FIG. 1 is an illustration of a top view of an aerial vehicle in flight in accordance with an illustrative embodiment.

Referring now to the figures and, in particular, with reference to FIG. 1, an illustration of a top view of an aerial vehicle in flight is depicted in accordance with an illustrative embodiment. In this illustrative example, aerial vehicle 100 is flying over terrain 102.

Aerial vehicle 100 may be a supersonic aircraft. In other words, aerial vehicle 100 may be capable of traveling at a speed greater than the speed of sound. In this illustrative example, aerial vehicle 100 is traveling above terrain 102 in the direction of arrow 104 at a supersonic speed, which creates a sonic boom (not shown). This sonic boom may have wavefront 110. This sonic boom is detected by microphone array 106. Microphone array 106 may be a non-redundant microphone spiral array. The non-redundant microphone spiral array may be, for example, a non-redundant, multi-arm, spiral array.

In this illustrative example, microphone array 106 may be comprised of microphones arranged along a plane that is substantially parallel to a ground plane through terrain 102 at the location of microphone array 106. The ground plane may be a plane representing the ground of terrain 102, the surface of ocean 103, or both. In some cases, the ground of terrain 102, the surface of ocean 103, or both, may vary in elevation. In other illustrative examples, the microphones in microphone array 106 may be arranged along a plane that is angularly offset with respect to the ground plane.

As depicted, ground station 108 is located near microphone array 106. A signal processing system (not shown) is located at ground station 108. This signal processing system is used to receive and process electrical signals from microphone array 106. The signal processing system may, for example, digitize these electrical signals to form data. This data may then be used to determine a direction of arrival of the sonic boom detected by microphone array 106.

Although the signal processing system is described as being located at ground station 108, in other illustrative examples, one or more components of the signal processing system may be in one or more locations remote to microphone array 106. For example, the signal processing system may include a data processor that is located at some other ground station, onboard a ground vehicle or aerospace vehicle, or in some other location. In still other illustrative examples, the signal processing system may be implemented as part of microphone array 106. For example, one or more components of the signal processing system may be embedded as part of microphone array 106. An example of one manner in which this signal processing system may be implemented is described in FIG. 2 below.

Figure 2:
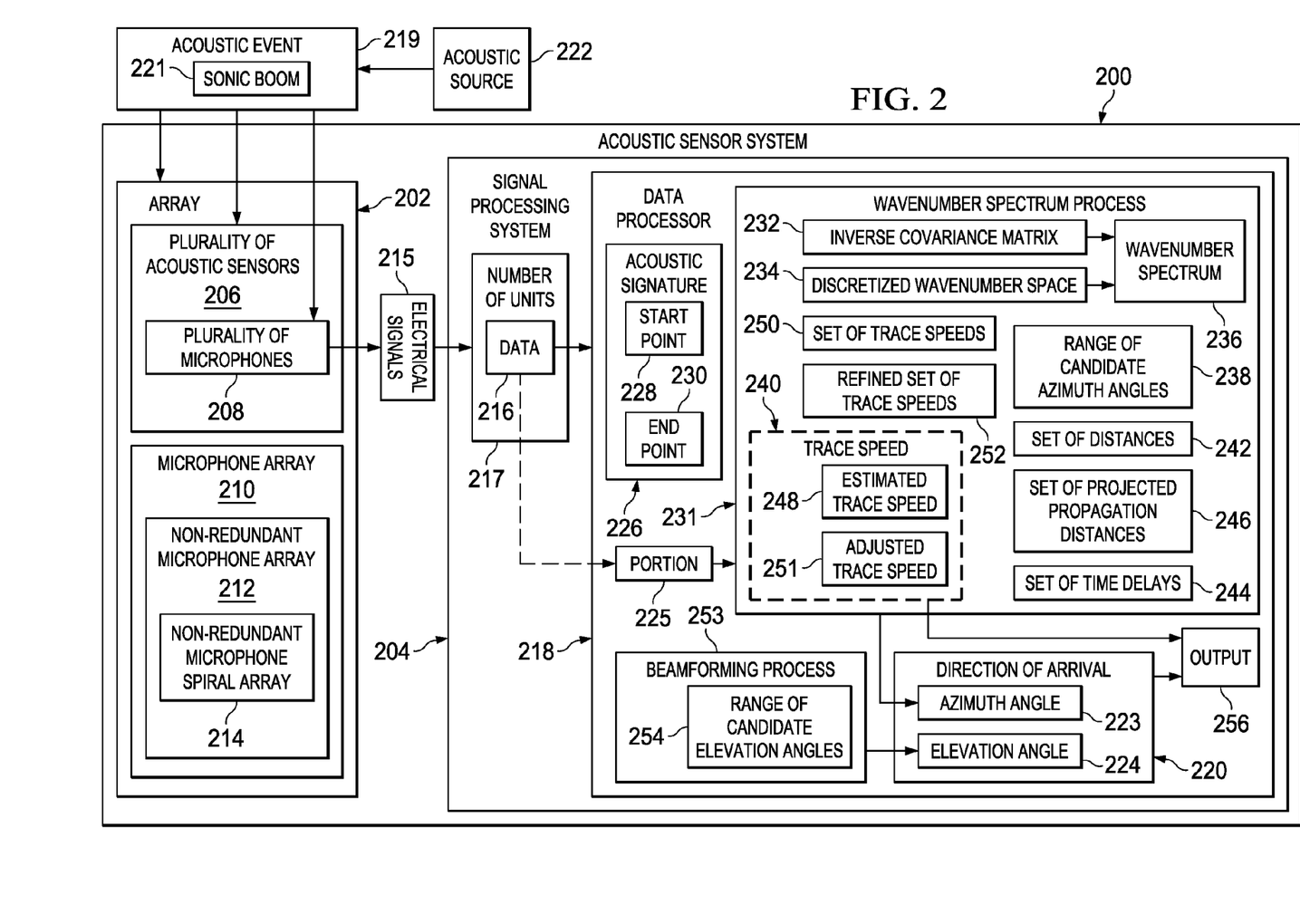
FIG. 2 is an illustration of an acoustic sensor system in the form of a block diagram in accordance with an illustrative embodiment.

With reference now to FIG. 2, an illustration of an acoustic sensor system is depicted in the form of a block diagram in accordance with an illustrative embodiment. In this illustrative example, acoustic sensor system 200 may include array 202 and signal processing system 204.

As depicted, array 202 may be comprised of plurality of acoustic sensors 206. In one illustrative example, plurality of acoustic sensors 206 may take the form of plurality of microphones 208. In this manner, array 202 may be referred to as microphone array 210.

In some illustrative examples, microphone array 210 may take the form of non-redundant microphone array 212 in which plurality of microphones 208 may be sufficiently spaced apart such that the distance between each different pair of microphones in plurality of microphones 208 is different or unique. In other words, the spacing between the microphones in plurality of microphones 208 may be non-redundant. In some illustrative examples, plurality of microphones 208 may be positioned at least a minimum distance from each other such that an acoustic signal or acoustic event that arrives at array 202 arrives at a different time at each of plurality of microphones 208 when the direction of arrival of the acoustic signal or acoustic event is offset from a substantially perpendicular direction relative to a plane through plurality of microphones 208.

The non-redundant spacing of plurality of microphones 208 may be achieved using a spiral-type pattern. For example, plurality of microphones 208 may be arranged along a spiral-type pattern. In some cases, this spiral-type pattern may have more than one arm such that the pattern is comprised of multiple spirals. In this manner, non-redundant microphone array 212 may be sometimes referred to as non-redundant microphone spiral array 214. Depending on the implementation, non-redundant microphone spiral array 214 may be a non-redundant multi-arm spiral array.

Plurality of acoustic sensors 206 in array 202 is configured to detect acoustic waves, such as, for example, without limitation, sound waves or other types of vibration waves. Plurality of acoustic sensors 206 converts the acoustic waves received at plurality of acoustic sensors 206 into electrical signals 215. Signal processing system 204 receives and processes electrical signals 215 to form data 216. Electrical signals 215 may be analog signals, while data 216 may be digital data in these illustrative examples.

Signal processing system 204 may be implemented using hardware, firmware, software, or a combination thereof. As one illustrative example, signal processing system 204 may include number of units 217 and data processor 218. Number of units 217 may include at least one of a pre-amplifier, an amplifier, a multiplier, a filter, a modulator, an analog-to-digital converter (ADC), an up-converter, a down-converter, or some other type of processing unit. As used herein, a "number of" items may include one or more items. In this manner, number of units 217 may include one or more units.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Number of units 217 may be used to receive electrical signals 215 and process electrical signals 215 to form data 216. In this manner, data 216 may be acquired from array 202. Consequently, in some cases, data 216 may be also referred to as array data. When plurality of acoustic sensors 206 takes the form of plurality of microphones 208, data 216 may be referred to as microphone data. Data 216 may include time-series data for each of plurality of acoustic sensors 206. Data processor 218 then processes data 216.

Depending on the implementation, data processor 218 may be co-located with or located remotely from number of units 217. As one illustrative example, number of units 217 may be located within a ground station in close proximity to array 202, while data processor 218 may be located at a ground station in a different city, onboard a ground vehicle or aerospace vehicle, or in some other area.

When acoustic event 219 arrives at array 202, signal processing system 204 is configured to determine direction of arrival 220 of acoustic event 219. Acoustic event 219 may be an acoustic event of interest, such as, for example, without limitation, sonic boom 221. Acoustic event 219 may be created by acoustic source 222. Acoustic source 222 may take any of a number of different forms. In one illustrative example, acoustic source 222 may be any object capable of traveling at a speed greater than the speed of sound. In other words, acoustic source 222 may take the form of a supersonic object. For example, without limitation, acoustic source 222 may take the form of an aerial vehicle, a missile, an aerospace vehicle, or some other type of object capable of traveling at supersonic speeds.

Direction of arrival 220 of acoustic event 219 may be defined using azimuth angle 223 and elevation angle 224. Azimuth angle 223 may also be referred to as the angular heading relative to array 202 along which acoustic event 219 is propagating when acoustic event 219 arrives at array 202.

Data processor 218 may use data 216 to determine direction of arrival 220 of acoustic event 219. In these illustrative examples, data processor 218 may identify portion 225 of data 216 that represents acoustic signature 226 for acoustic event 219.

Data processor 218 uses data 216 to identify the earliest point in time at which any of plurality of acoustic sensors 206 detects, for example, without limitation, a sound pressure level above a selected threshold. The selected threshold may be, for example, without limitation, a fixed level above ambient noise. Ambient noise may be the background noise with respect to the particular environment in which array 202 is located.

The fixed level may be, for example, without limitation, between about 5 decibels to about 40 decibels. In this manner, the selected threshold may be between about 5 decibels and about 40 decibels above the ambient noise. The fixed level selected may be based on the characteristics of a particular environment in which array 202 is located. For example, a higher fixed level may be selected when the environment is noisy.

Data processor 218 uses the earliest point in time at which any of plurality of acoustic sensors 206 detects a sound pressure level above the selected threshold to determine start point 228 for acoustic signature 226. In one illustrative example, the identified point in time may be used as start point 228. In other illustrative examples, start point 228 may be computed as a point in time earlier than the identified point in time by some selected time interval. The time interval may be, for example, without limitation, two seconds, three seconds, five seconds, seven seconds, or some other time interval.

Data processor 218 then identifies end point 230 for acoustic signature 226 based on start point 228. For example, data processor 218 may identify the first point in time after start point 228 at which the sound pressure level for all of plurality of acoustic sensors 206 drops back down below the selected threshold and stays below the selected threshold for a selected period of time as end point 230.

In another illustrative example, data processor 218 identifies the first point in time after start point 228 at which the sound pressure level for all of plurality of acoustic sensors 206 drops below the selected threshold or drops below and stays below the selected threshold for some selected period of time. In this example, end point 230 is computed by adding a selected time interval to this identified point in time. The selected time interval may be, for example, without limitation, two seconds, three seconds, five seconds, seven seconds, or some other time interval. The selected time interval takes into account that the acoustic waves that arrive at array 202 are oscillating waves. The selected time interval may be added to ensure that desired content belonging to acoustic signature 226 is captured.

The portions of the time-series data in data 216 for each of plurality of acoustic sensors 206 that fall within the window of time between start point 228 and end point 230 are included in portion 225 of data 216 representing acoustic signature 226. Acoustic signature 226 may also be referred to as a sonic boom signature when acoustic event 219 takes the form of sonic boom 221.

Data processor 218 uses portion 225 of data 216 to determine azimuth angle 223. As one illustrative example, data processor 218 may use wavenumber spectrum process 231 to compute azimuth angle 223.

Wavenumber spectrum process 231 may include computing inverse covariance matrix 232 using portion 225 of data 216. Inverse covariance matrix 232 may be computed by first computing a covariance matrix comprised of the zero-delay covariances for all pairs of acoustic sensors in plurality of acoustic sensors 206 using portion 225 of data 216. Taking the inverse of this covariance matrix creates inverse covariance matrix 232.

Data processor 218 also creates discretized wavenumber space 234. Discretized wavenumber space 234 may be wavenumber space that has been discretized with respect to an azimuthal component and a radial component of the wavenumber vector. Discretized wavenumber space 234 may also be referred to as discretized k-space, where k is wavenumber.

Data processor 218 may then compute wavenumber spectrum 236 using inverse covariance matrix 232 and discretized wavenumber space 234. In this illustrative example, wavenumber spectrum 236 may be estimated using inverse covariance matrix 232, discretized wavenumber space 234, and a multidimensional spectral estimation method. However, in other illustrative examples, wavenumber spectrum 236 may be estimated in some other way. For example, in other examples, wavenumber spectrum 236 may be estimated based on the covariance matrix instead of the inverse covariance matrix.

Wavenumber spectrum 236 is a two-dimensional spectrum. The power of acoustic event 219, which is a broadband source, may lie on a radial ridge in wavenumber spectrum 236. Data processor 218 integrates wavenumber spectrum 236 for each candidate azimuth angle in range of candidate azimuth angles 238 to obtain an integrated power for each candidate azimuth angle. In particular, data processor 218 radially integrates wavenumber spectrum 236 for each candidate azimuth angle to obtain an integrated power for that candidate azimuth angle.

In one illustrative example, range of candidate azimuth angles 238 may be a range of 360 degrees. The candidate azimuth angles may be selected at uniform intervals within this range of 360 degrees. For example, without limitation, range of candidate azimuth angles 238 may include candidate azimuth angles uniformly spaced using an interval of about 2 degrees, about 1 degree, about 0.5 degrees, or some other interval. In other illustrative examples, the candidate azimuth angles in range of candidate azimuth angles 238 may be non-uniformly spaced.

Integrating wavenumber spectrum 236, as described above, effectively produces an integrated power versus azimuth angle function. The peak of this function may be used as an estimate for azimuth angle 223. For example, data processor 218 may select the one candidate azimuth angle in range of candidate azimuth angles 238 having the maximum integrated power as azimuth angle 223 for acoustic event 219.

In some illustrative examples, azimuth angle 223 may then be used to compute trace speed 240. Trace speed 240 may be the speed of acoustic event 219 in the direction of azimuth angle 223 along the plane of array 202. When the plane of array 202 is substantially parallel to the ground and acoustic event 219 is also travelling substantially parallel to the ground, trace speed 240 may be the same as the ground speed of acoustic source 222. The ground speed of acoustic source 222 may be the speed of acoustic source 222 with respect to the ground or a ground plane. When acoustic event 219 is sonic boom 221, the propagation speed of acoustic event 219 in direction of arrival 220 at the time of arrival at array 202 may be the speed of sound. When acoustic source 222 is moving at supersonic speeds, trace speed 240 may be greater than the speed of sound.

To determine trace speed 240, data processor 218 computes set of distances 242 and set of time delays 244. As used herein, a "set of" items may include one or more items. In this manner, set of distances 242 may include one or more distances and set of time delays 244 may include one or more time delays.

Each distance in set of distances 242 is the distance between a pair of acoustic sensors in plurality of acoustic sensors 206 that make up array 202. Similarly, each time delay in set of time delays 244 is the time delay between the times at which acoustic event 219 arrives at each acoustic sensor in a pair of acoustic sensors in plurality of acoustic sensors 206 that make up array 202. Each time delay in set of time delays 244 may be computed using a cross-correlation process. In this manner, a distance and a corresponding time delay may be computed for each pair of acoustic sensors in plurality of acoustic sensors 206.

Data processor 218 then projects each of set of distances 242 along a direction of azimuth angle 223 to form set of projected propagation distances 246. Together, set of projected propagation distances 246 and set of time delays 244 may be used to compute estimated trace speed 248.

In particular, each of set of projected propagation distances 246 may be divided by a corresponding one of set of time delays 244 to form set of trace speeds 250. Set of trace speeds 250 may be averaged to generate estimated trace speed 248. Estimated trace speed 248 may then be used as trace speed 240 for acoustic event 219.

In some illustrative examples, estimated trace speed 248 may be refined to generate adjusted trace speed 251 for acoustic event 219. This refinement may be performed using an outlier rejection process. The outlier rejection process may be a robust or non-robust technique for rejecting outliers based on any number of statistical criteria.

As one illustrative example, any of set of trace speeds 250 that deviate more than two standard deviations away from estimated trace speed 248 may be rejected to create refined set of trace speeds 252. As another example, refined set of trace speeds 252 may be created by rejecting any of set of trace speeds 250 that deviate from estimated trace speed 248 with respect to some other type of statistical measure or marker.

Refined set of trace speeds 252 may then be averaged to generate adjusted trace speed 251. Adjusted trace speed 251 may be used as trace speed 240 for acoustic event 219, in these examples.

In this manner, depending on the implementation, either estimated trace speed 248 or adjusted trace speed 251 may be used as trace speed 240. In some instances, azimuth angle 223 may need to be corrected based on the identification of trace speed 240. Wavenumber spectrum 236 may be an even function for real signals. Consequently, the estimation of azimuth angle 223 based on wavenumber spectrum 236 may provide an axis of propagation projected onto the plane of array 202 but may not indicate the direction of propagation along that axis. This ambiguity in azimuth angle 223 may be accounted for using trace speed 240 because the sign of trace speed 240 indicates direction.

For example, without limitation, if trace speed 240 has a negative sign, azimuth angle 223 is rotated about 180 degrees to accurately reflect the direction of propagation of acoustic event 219. Further, the negative sign of trace speed 240 is changed to a positive sign.

Once data processor 218 has computed azimuth angle 223, data processor 218 may use beamforming process 253 to compute elevation angle 224. Beamforming process 253 may be based on power output of array 202 and rely on time delays to determine elevation angle 224. As one illustrative example, data processor 218 may compute the power output of array 202 for each candidate elevation angle in range of candidate elevation angles 254 at azimuth angle 223. Data processor 218 selects one candidate elevation angle in range of candidate elevation angles 254 having a maximum power output as elevation angle 224 for acoustic event 219.

The identification of azimuth angle 223 reduces range of candidate elevation angles 254 that need to be considered to a range of about 90 degrees. The candidate elevation angles may be selected at uniform intervals within this range of 90 degrees. For example, without limitation, range of candidate elevation angles 254 may include candidate azimuth angles uniformly spaced using an interval of about 2 degrees, about 1 degree, about 0.5 degrees, or some other interval. In other illustrative examples, the candidate elevation angles in range of candidate elevation angles 254 may be non-uniformly spaced. Depending on the implementation, each of range of candidate azimuth angles 238 and range of candidate elevation angles 254 may be identified based on user input, randomly selected from within a range, computed based on a selected uniform interval, or identified in some other manner.

Data processor 218 may be configured to generate output 256 that identifies direction of arrival 220 of acoustic event 219 as defined by azimuth angle 223 and elevation angle 224 computed for acoustic event 219. In some cases, output 256 may also include trace speed 240 computed for acoustic event 219.

The time, computational processing, and processing resources needed to determine direction of arrival 220 of acoustic event 219 may be reduced using the methodology described above. Computing azimuth angle 223 using wavenumber spectrum process 231, and then using this azimuth angle 223 to customize, or tailor, beamforming process 253 to determine elevation angle 224 may significantly reduce the overall amount of time and processing needed to determine direction of arrival 220 of acoustic event 219 with the desired level of accuracy.

For example, if wavenumber spectrum process 231 is not used, then the power output of array 202 for each candidate elevation angle in range of candidate elevation angles 254 at each candidate azimuth angle in range of candidate azimuth angles 238 may need to be computed. As one illustrative example, range of candidate azimuth angles 238 may include 360 candidate azimuth angles between 0 degrees and 360 degrees and range of candidate elevation angles 254 between 0 degrees and 90 degrees. Using only beamforming process 253 may require performing 360 times 90 power output calculations, which may total 32,400 power output calculations. However, by using wavenumber spectrum process 231 in a unique combination with beamforming process 253, the total number of calculations may be reduced to 360 integrated power calculations through wavenumber spectrum process 231 plus 90 power output calculations through beamforming process 253, which may total 450 power output calculations.

The process described for determining direction of arrival 220 of acoustic event 219 may be used to detect multiple acoustic events. For example, multiple simultaneous, sequential, or overlapping acoustic events may be detected. When multiple acoustic events arrive at array 202 at different windows of time, the process described above may be repeated for the portion of data identified as corresponding to each of these different windows of time.

When multiple acoustic events arrive at array 202 simultaneously or in an overlapping manner, these multiple acoustic events may be detected as part of the identification of azimuth angle, as part of the identification of elevation angle, or both. When wavenumber spectrum 236 is integrated, the integrated power versus azimuth angle function may have a plurality of local maxima. The plurality of local maxima may also be referred to as a plurality of azimuth peaks. Beamforming process 253 may be performed for each azimuth angle corresponding to these multiple local maxima.

Similarly, when performing beamforming process 253, the power output may have a plurality of local maxima. The plurality of local maxima may also be referred to as a plurality of elevation peaks. Consequently, for any given azimuth angle, one or more elevation angles may be identified. If, for example, two elevation angles are identified for a particular azimuth angle, then the first combination of the particular azimuth angle with the first elevation angle may represent a first acoustic event, while the second combination of the particular azimuth angle with the second elevation angle may represent a second acoustic event.

In this manner, wavenumber spectrum process 231 may be used to compute a set of azimuth angles and beamforming process 253 may be used to compute a set of elevation angles for each azimuth angle in this set of azimuth angles. The set of azimuth angles and the set of elevation angles identified for each azimuth angle in the set of azimuth angles may be used to detect a set of acoustic events. In particular, for each azimuth angle identified, each unique combination of that azimuth angle and elevation angle identified for that azimuth angle may represent the detection of a different acoustic event. Consequently, any number of acoustic events may be detected using the type of methodology described above.

The process described for determining direction of arrival 220 may be used for sonic boom 221 or some other type of broadband signature. Being able to more quickly and easily determine direction of arrival 220 may aid in efforts to improve regulations on supersonic flights creating low sonic booms. Further, the process described above may be used to determine direction of arrival 220 in substantially real-time or near real-time, which may aid in improving the efficiency and efficacy of sonic boom testing.

Further, using the process described above for broadband signals in conjunction with non-redundant microphone spiral array 214 may improve the accuracy with which direction of arrival 220 is estimated. Additionally, using the process described above for broadband signals in conjunction with non-redundant microphone spiral array 214 may improve the suppression of side lobes.

The illustration of acoustic sensor system 200 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, portion 225 of data 216 may be corrected for instrumentation delays prior to being used to determine azimuth angle 223. In this manner, portion 225 of data 216 may be corrected to form corrected data that may be used by data processor 218 to compute azimuth angle 223. In other illustrative examples, trace speed 240 may not be computed.

In the illustrative examples described above, data processor 218 is described as being part of signal processing system 204, and thereby, part of acoustic sensor system 200. However, in other illustrative examples, data processor 218 may be considered separate from and independent of signal processing system 204. In some cases, depending on the implementation, data processor 218 may be separate from and independent of acoustic sensor system 200.

Figure 3:
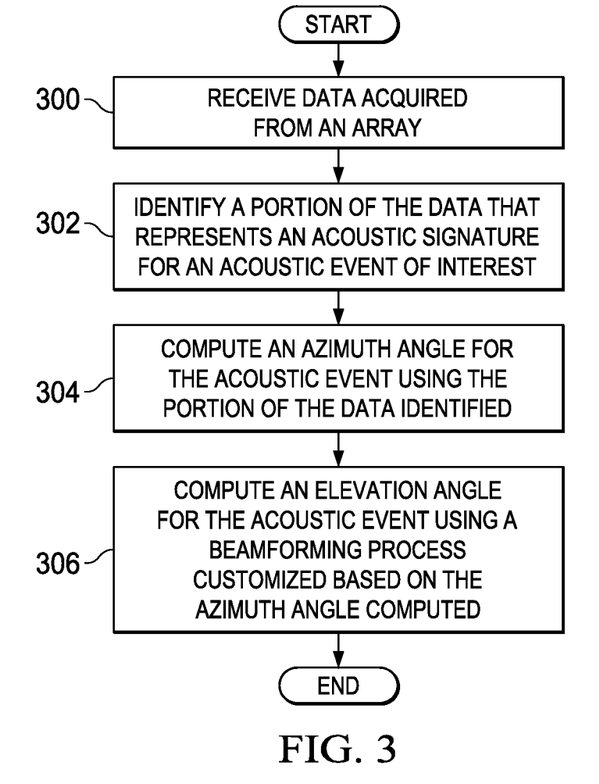
FIG. 3 is an illustration of a process for determining a direction of arrival of an acoustic event of interest that arrives at an array in the form of a flowchart in accordance with an illustrative embodiment.

With reference now to FIG. 3, an illustration of a process for determining a direction of arrival of an acoustic event of interest that arrives at an array is depicted in the form of a flowchart in accordance with an illustrative embodiment. The process illustrated in FIG. 3 may be implemented using acoustic sensor system 200 in FIG. 2. This process may be used to determine a direction of arrival of an acoustic event of interest that arrives at an array, such as array 202 in FIG. 2.

The process may begin by receiving data acquired from an array (operation 300). The array may be comprised of a plurality of acoustic sensors. Next, a portion of the data that represents an acoustic signature for an acoustic event of interest is identified (operation 302). An azimuth angle may then be computed for the acoustic event using the portion of the data identified (operation 304). Thereafter, an elevation angle for the acoustic event may be computed using a beamforming process customized based on the azimuth angle computed (operation 306), with the process terminating thereafter.

Figure 4:
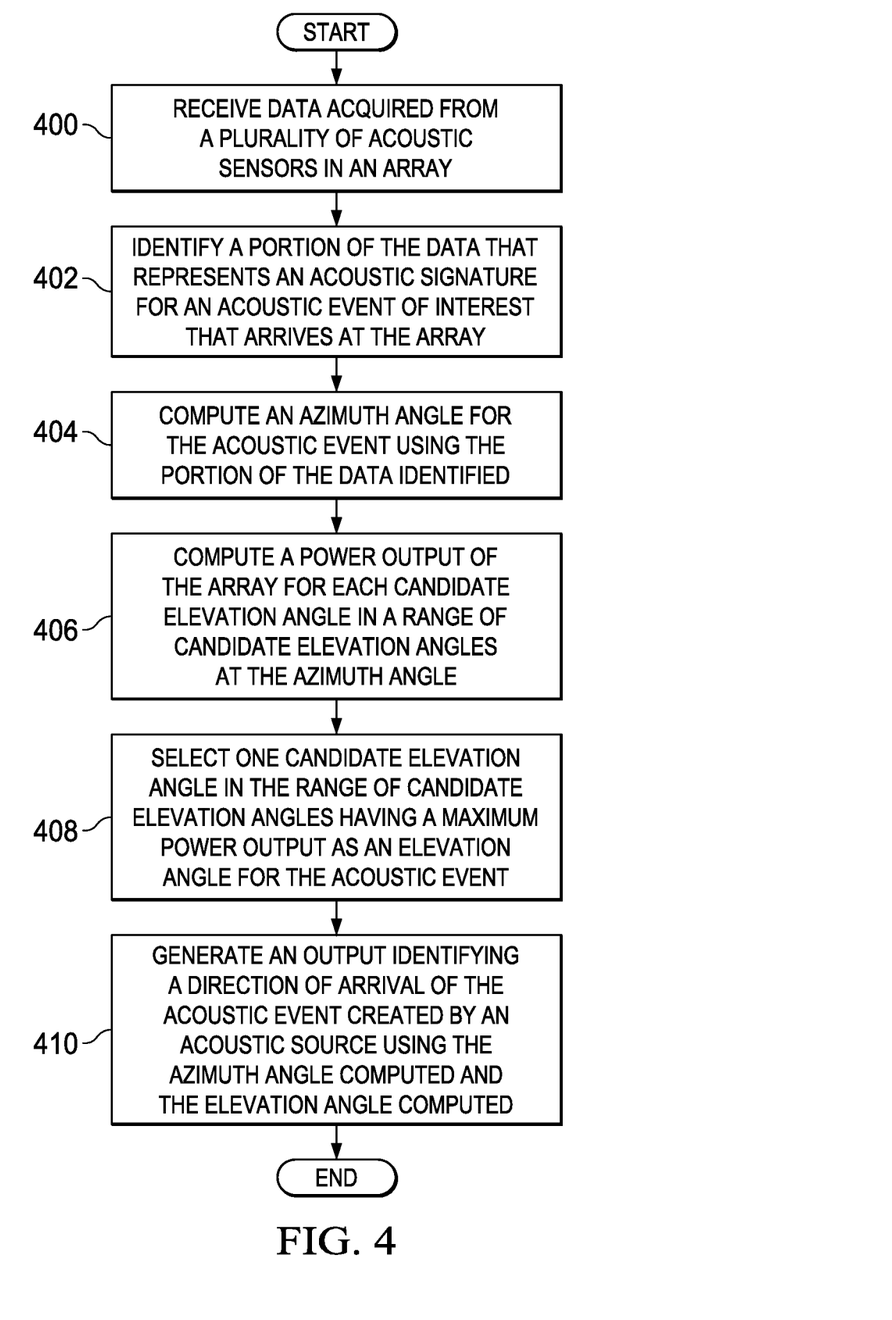
FIG. 4 is an illustration of a process for determining a direction of arrival of an acoustic event of interest that arrives at an array in the form of a flowchart in accordance with an illustrative embodiment.

With reference now to FIG. 4, an illustration of a process for determining a direction of arrival of an acoustic event of interest that arrives at an array is depicted in the form of a flowchart in accordance with an illustrative embodiment. The process illustrated in FIG. 4 may be implemented using acoustic sensor system 200 in FIG. 2. This process may be used to determine a direction of arrival of an acoustic event of interest, such as sonic boom 221 in FIG. 2 that arrives at an array, such as array 202 in FIG. 2.

The process may begin by receiving data acquired from a plurality of acoustic sensors in an array (operation 400). Next, a portion of the data that represents an acoustic signature for an acoustic event of interest that arrives at the array is identified (operation 402). An azimuth angle may then be computed for the acoustic event using the portion of the data identified (operation 404). An example of one manner in which operation 404 may be performed is described in greater detail in FIG. 5 below.

Thereafter, a power output of the array is computed for each candidate elevation angle in a range of candidate elevation angles at the azimuth angle (operation 406). One candidate elevation angle in the range of candidate elevation angles having a maximum power output is selected as an elevation angle for the acoustic event (operation 408). An output identifying a direction of arrival of the acoustic event created by an acoustic source is generated using the azimuth angle computed and the elevation angle computed (operation 410), with the process terminating thereafter. The acoustic source may be, for example, a supersonic aerial vehicle.

Figure 5:
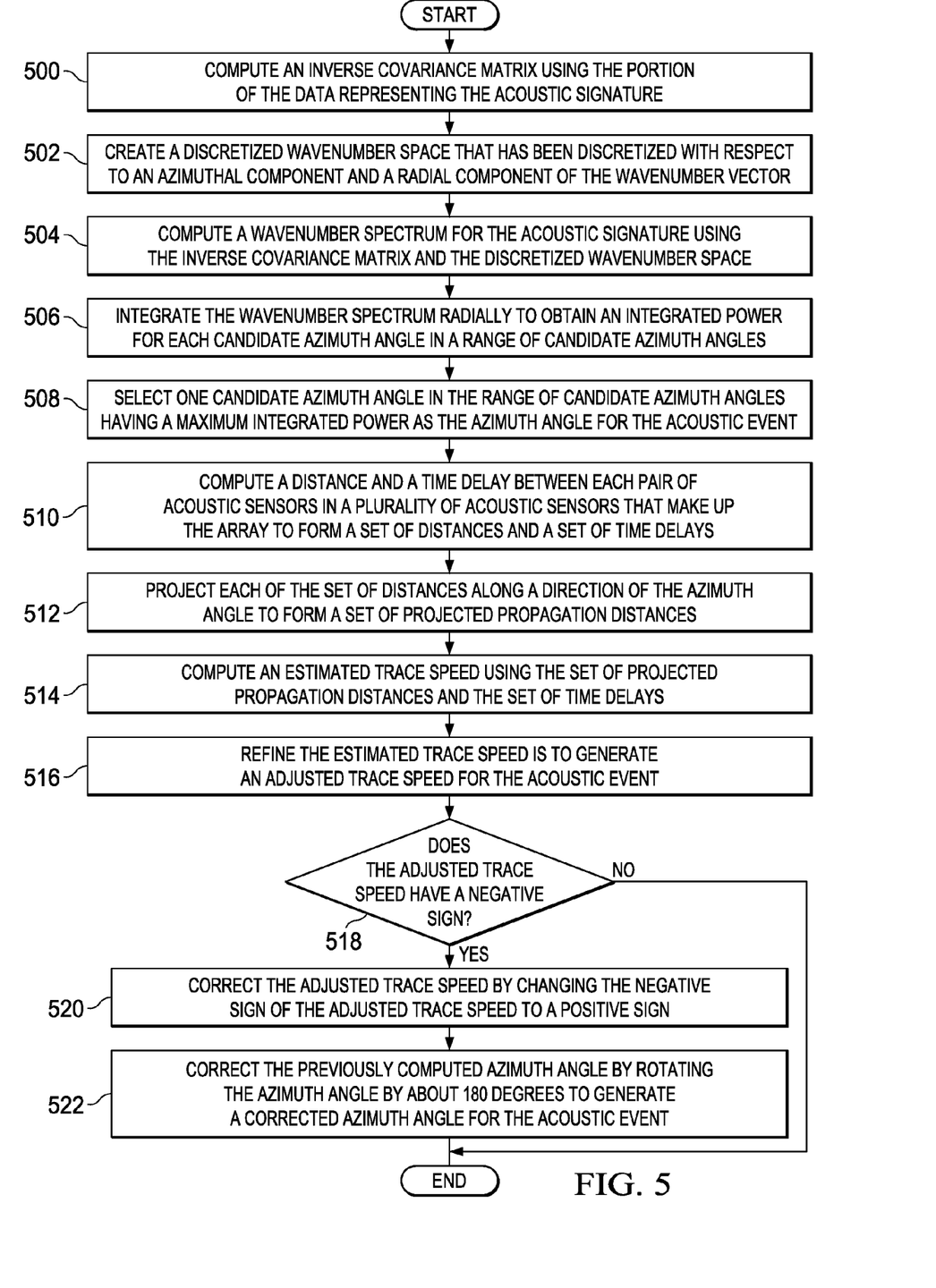
FIG. 5 is an illustration of a process for computing an azimuth angle for an acoustic event in the form of a flowchart in accordance with an illustrative embodiment.

With reference now to FIG. 5, an illustration of a process for computing an azimuth angle for an acoustic event is depicted in the form of a flowchart in accordance with an illustrative embodiment. The process illustrated in FIG. 5 may be implemented using acoustic sensor system 200 in FIG. 2.

The process begins by computing an inverse covariance matrix using the portion of the data representing the acoustic signature (operation 500). In operation 500, the inverse covariance matrix may be computed by first computing a covariance matrix and then taking the inverse of this covariance matrix. Next, a discretized wavenumber space that has been discretized with respect to an azimuthal component and a radial component of the wavenumber vector is created (operation 502). A wavenumber spectrum is computed for the acoustic signature using the inverse covariance matrix and the discretized wavenumber space (operation 504).

Thereafter, the wavenumber spectrum is integrated radially to obtain an integrated power for each candidate azimuth angle in a range of candidate azimuth angles (operation 506). One candidate azimuth angle in the range of candidate azimuth angles having a maximum integrated power is selected as the azimuth angle for the acoustic event (operation 508). In other words, performing operation 506 may effectively produce an integrated power versus azimuth angle function, the peak of which is selected in operation 508 as the azimuth angle.

Next, a distance and a time delay are computed between each pair of acoustic sensors in a plurality of acoustic sensors that make up the array to form a set of distances and a set of time delays (operation 510). In operation 510, each time delay in the set of time delays may be computed using a cross-correlation process. Each of the set of distances is projected along a direction of the azimuth angle to form a set of projected propagation distances (operation 512). Then, an estimated trace speed is computed using the set of projected propagation distances and the set of time delays (operation 514).

The estimated trace speed is then refined to generate an adjusted trace speed for the acoustic event (operation 516). A determination is made as to whether the adjusted trace speed has a negative sign (operation 518). If the adjusted trace speed does not have a negative sign, the process terminates, with the adjusted trace speed being used as the trace speed for the acoustic event. Otherwise, the adjusted trace speed is corrected by changing the negative sign of the adjusted trace speed to a positive sign (operation 520). Next, the previously computed azimuth angle is corrected by rotating the azimuth angle by about 180 degrees to generate a corrected azimuth angle for the acoustic event (operation 522), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
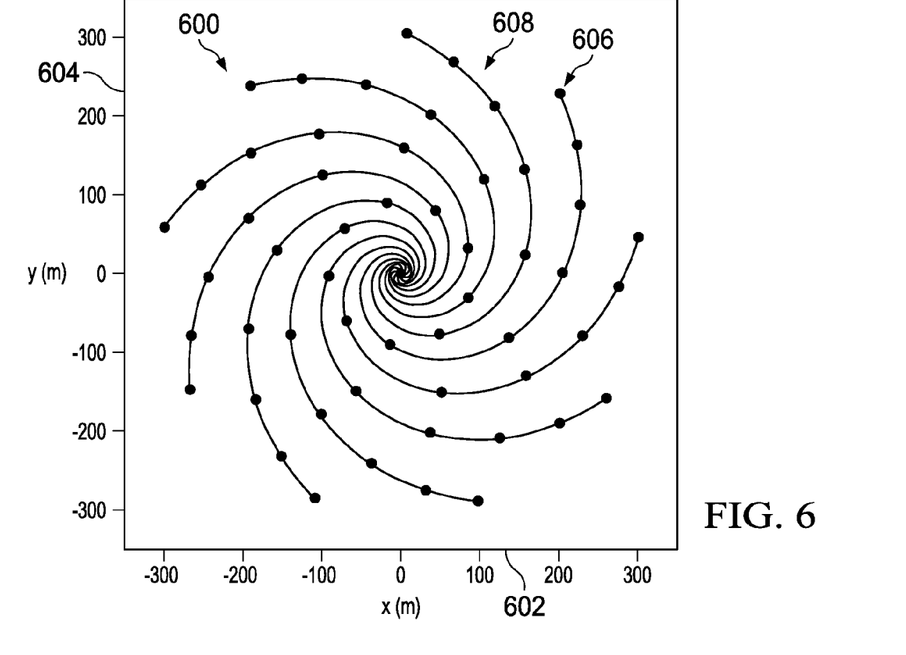
FIG. 6 is an illustration of a plot of a configuration for a microphone array in accordance with an illustrative embodiment.

With reference now to FIG. 6, an illustration of a plot of a configuration for a microphone array is depicted in accordance with an illustrative embodiment. In this illustrative example, plot 600 includes horizontal axis 602 and vertical axis 604. Horizontal axis 602 represents an x-axis in meters and vertical axis 604 represents a y-axis in meters.

In this illustrative example, plurality of points 606 in plot 600 indicates the locations of microphones in a microphone array. As depicted, the microphones are configured according to spiral pattern 608. In particular, the microphones are arranged such that the microphones form a non-redundant, multi-arm, spiral array.

Figure 7:
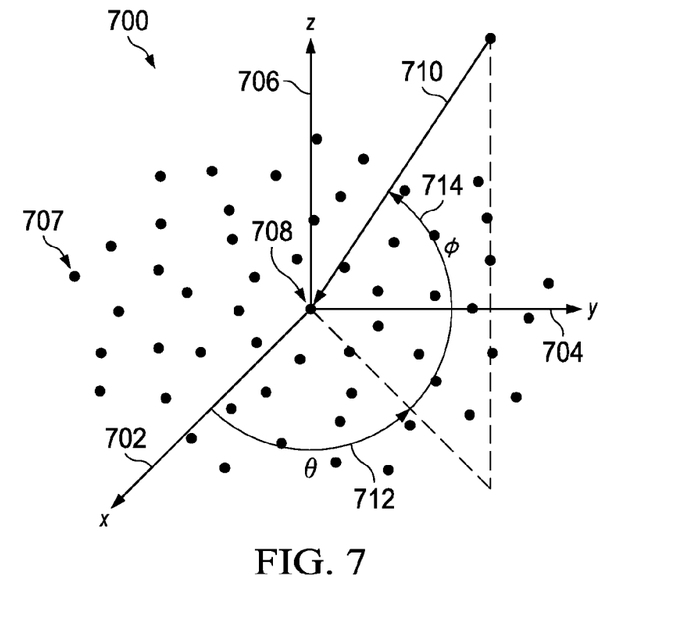
FIG. 7 is an illustration of a direction of arrival of an acoustic event with respect to a coordinate system for an array in accordance with an illustrative embodiment.

With reference now to FIG. 7, an illustration of a direction of arrival of an acoustic event with respect to a coordinate system for an array is depicted in accordance with an illustrative embodiment. In this illustrative example, coordinate system 700 may be for an array, such as array 202 in FIG. 2. Coordinate system 700 includes x-axis 702, y-axis 704, and z-axis 706.

Plurality of points 707 indicates the locations of microphones in a microphone array in correspondence with plurality of points 606 in FIG. 6. Origin 708 of coordinate system 700 may represent the center of the microphone array. Further, the plane formed by x-axis 702 and y-axis 704 represents the plane of the microphone array. In one illustrative example, this plane may be substantially parallel to the ground.

Direction of arrival 710 may be one example of direction of arrival 220 for acoustic event 219 in FIG. 2. In this illustrative example, direction of arrival 710 may be an example of the direction along which a sonic boom is propagating when the sonic boom arrives at the microphone array. As depicted, direction of arrival 710 may be defined using azimuth angle 712 and elevation angle 714.

Figure 8:
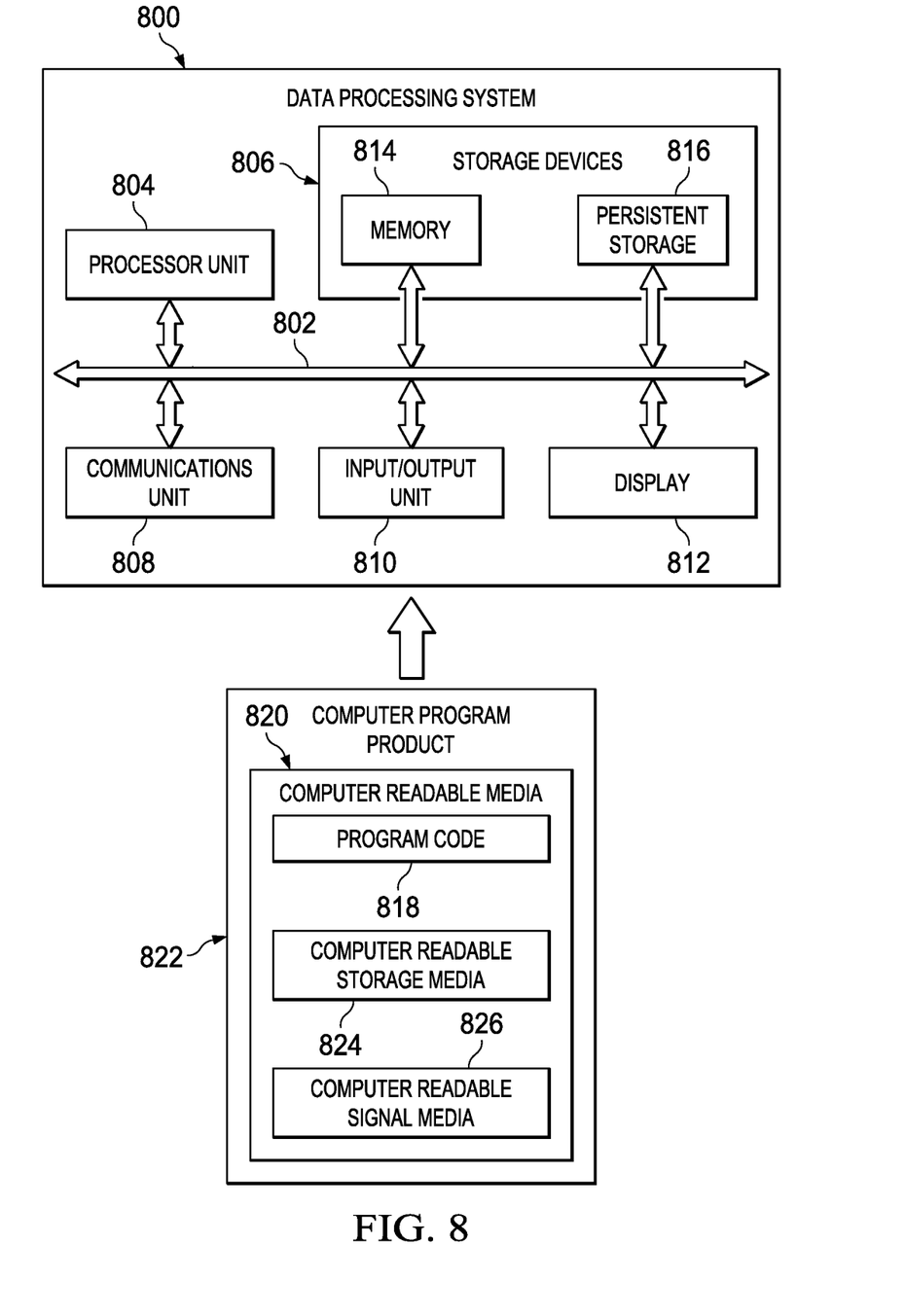
FIG. 8 is an illustration of a data processing system in the form of a block diagram in accordance with an illustrative embodiment.

Turning now to FIG. 8, an illustration of a data processing system is depicted in the form of a block diagram in accordance with an illustrative embodiment. Data processing system 800 may be used to implement data processor 218 in FIG. 2. In some cases, data processing system 800 may be used to implement one or more other components in signal processing system 204 in FIG. 2.

As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application-specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

Thus, the illustrative embodiments provide a method and apparatus for determining a direction of arrival of an acoustic event created by an acoustic source. The acoustic event may take the form of, but is not limited to, a sonic boom. The acoustic source may take the form of, but is not limited to, an aerial vehicle.

In one illustrative example, data generated by an array receiving acoustic waves created by an acoustic source is received. A portion of the received data that represents an acoustic signature for the acoustic event of interest may be identified. An azimuth angle for the acoustic source may be computed using the portion of the data identified and a wavenumber spectrum process. In some cases, a trace speed may also be computed using this wavenumber spectrum process. An elevation angle for the acoustic source may be computed using a beamforming process customized based on the azimuth angle computed.

In other illustrative examples, the methodology described by the various illustrative embodiments may be used to detect multiple acoustic events. For example, multiple simultaneous, sequential, or overlapping acoustic events may be detected. The methodology described by the various illustrative embodiments may be used to detect, for example, secondary sonic booms.

The illustrative embodiments also provide a method and apparatus for detecting a set of acoustic events that arrive at an array. The set of acoustic events may include one or more acoustic events. For example, the set of acoustic events may include at least one of a sonic boom, a gunshot, or some other type of acoustic event.

In one illustrative example, data acquired from the array may be received for processing. A portion of the data that represents an acoustic signature for at least one acoustic event of interest may be identified. A set of azimuth angles may be computed using the portion of the data identified and a wavenumber spectrum process. A set of elevation angles may then be computed for each azimuth angle in the set of azimuth angles using a beamforming process customized based on each azimuth angle. The set of azimuth angles and the set of elevation angles computed for each azimuth angle in the set of azimuth angles may then be used to detect a set of acoustic events.

For each particular azimuth angle in the set of azimuth angles, each unique pairing of that particular azimuth angle with an elevation angle in the set of elevation angles may represent a different acoustic event. Each unique pairing of azimuth angle and elevation angle may define the direction of arrival for the corresponding acoustic event. An output identifying the direction of arrival for each of the set of acoustic events detected may be generated.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for determining a direction of arrival of an acoustic event of interest that arrives at an array, the method comprising:
   receiving data acquired from the array;
   identifying a portion of the data that represents an acoustic signature for the acoustic event of interest;
   computing an azimuth angle for the acoustic event using the portion of the data identified, wherein computing the azimuth angle comprises;
   computing a wavenumber spectrum for the acoustic signature, wherein computing the wavenumber spectrum comprises:
      computing an inverse covariance matrix using the portion of the data representing the acoustic signature; and
      creating a discretized wavenumber space that has been discretized with respect to an azimuthal component and a radial component of a wavenumber vector; and
   computing the azimuth angle using the wavenumber spectrum; and
   computing an elevation angle for the acoustic event using a beamforming process customized based on the azimuth angle computed.

2. The method of claim 1 further comprising:
   generating an output that identifies the direction of arrival of the acoustic event using the azimuth angle and the elevation angle computed for the acoustic event.

3. The method of claim 1, wherein computing the elevation angle for the acoustic event using the beamforming process customized based on the azimuth angle computed reduces an amount of time and processing power needed to identify the direction of arrival of the acoustic event.

4. The method of claim 1, wherein computing the elevation angle comprises:
   identifying a range of candidate elevation angles; and
   computing a power output of the array for each candidate elevation angle in the range of candidate elevation angles at the azimuth angle; and
   selecting one candidate elevation angle in the range of candidate elevation angles having a maximum power output as the elevation angle for the acoustic event.

5. The method of claim 1 wherein computing the wavenumber spectrum further comprises:
   computing the wavenumber spectrum using the inverse covariance matrix and the discretized wavenumber space.

6. The method of claim 1 wherein computing the azimuth angle using the wavenumber spectrum comprises:
   integrating the wavenumber spectrum radially to obtain an integrated power for each candidate azimuth angle in a range of candidate azimuth angles; and
   selecting one candidate azimuth angle in the range of candidate azimuth angles having a maximum integrated power as the azimuth angle for the acoustic event.

7. The method of claim 6, wherein computing the azimuth angle further comprises:
   correcting the azimuth angle based on an identification of a trace speed for the acoustic event.

8. The method of claim 1 further comprising:
   identifying a trace speed of the acoustic event using the azimuth angle computed.

9. The method of claim 8, wherein identifying the trace speed comprises:
   computing a distance and a time delay between each pair of acoustic sensors in a plurality of acoustic sensors that make up the array to form a set of distances and a set of time delays.

10. The method of claim 9, wherein identifying the trace speed comprises:
    projecting each of the set of distances along a direction of the azimuth angle to form a set of projected propagation distances; and computing an estimated trace speed using the set of projected propagation distances and the set of time delays.

11. The method of claim 10, wherein computing the estimated trace speed comprises:
    computing a set of trace speeds by dividing each distance in the set of distances by a corresponding one of the set of time delays; and
    averaging the set of trace speeds to generate the estimated trace speed.

12. The method of claim 11, wherein identifying the trace speed further comprises:
    refining the estimated trace speed to generate an adjusted trace speed for the acoustic event.

13. The method of claim 12, wherein refining the estimated trace speed comprises:
    refining the set of trace speeds using an outlier rejection process to create a refined set of trace speeds; and
    averaging the refined set of trace speeds to generate the adjusted trace speed for the acoustic event.

14. A method for determining a direction of arrival of a sonic boom that arrives at an array, the method comprising:
    receiving data acquired from the array;
    identifying a portion of the data that represents a sonic boom signature for the sonic boom that arrives at the array;
    computing an azimuth angle for the sonic boom using the portion of the data identified; and
    computing an elevation angle for the sonic boom using a beamforming process customized based on the azimuth angle computed.

15. The method of claim 14, wherein computing the azimuth angle comprises:
    computing a wavenumber spectrum for an acoustic signature; and
    computing the azimuth angle using the wavenumber spectrum.

16. An apparatus comprising:
    an array comprised of a plurality of acoustic sensors; and
    a data processor that receives data acquired from the array, identifies a portion of the data that represents an acoustic signature for an acoustic event of interest, computes an azimuth angle for an acoustic event using the portion of the data identified, and computes an elevation angle for the acoustic event using a beamforming process customized based on the azimuth angle computed.

17. The apparatus of claim 16, wherein the data processor computes the azimuth angle and a trace speed for the acoustic event using a wavenumber spectrum process.

18. The apparatus of claim 16, wherein the array is a non-redundant microphone spiral array comprised of a plurality of microphones and wherein an acoustic source is an aerial vehicle.

* * * * *